United States Patent
Chennai et al.

(10) Patent No.: US 9,507,862 B2
(45) Date of Patent: Nov. 29, 2016

(54) CHRONOLOGY BASED CONTENT PROCESSING

(71) Applicant: Microsoft Technology Licensing, LLC, Redmond, WA (US)

(72) Inventors: Selvi Chennai, Issaquah, WA (US); Andrey Prokofyev, Redmond, WA (US); Mridu Baldevraj Narang, Bellevue, WA (US); Pavel Rusin, Redmond, WA (US); Ramesh Raman, Redmond, WA (US); Sameer Bhangar, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 331 days.

(21) Appl. No.: 13/804,136

(22) Filed: Mar. 14, 2013

(65) Prior Publication Data

US 2014/0280013 A1 Sep. 18, 2014

(51) Int. Cl.
*G06N 5/04* (2006.01)
*G06F 17/30* (2006.01)
*G06F 17/27* (2006.01)

(52) U.S. Cl.
CPC ..... *G06F 17/30864* (2013.01); *G06F 17/2775* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 7,440,948 B2 | 10/2008 | Trowbridge et al. | |
| 8,285,668 B2 | 10/2012 | Kaiser | |
| 8,938,688 B2* | 1/2015 | Bradford | G06N 99/005 706/11 |
| 2007/0055656 A1* | 3/2007 | Tunstall-Pedoe | 707/3 |
| 2008/0082578 A1* | 4/2008 | Hogue et al. | 707/104.1 |
| 2009/0144609 A1* | 6/2009 | Liang | G06F 17/21 715/230 |
| 2012/0117099 A1* | 5/2012 | Gross | G06F 19/322 707/758 |
| 2014/0046934 A1* | 2/2014 | Zhou et al. | 707/723 |

OTHER PUBLICATIONS

Lenat, D. "The Dimensions of Context Space". Oct. 28, 1998.*
Kimura, R. et al. "Creating Personal Histories from the Web Using Namesake Disambiguation and Event Extraction." Web Engineering. Lecture Notes in Computer Science vol. 4607, 2007, pp. 400-414. DOI:10.1007/978-3-540-73597-7_33.*
Warner, J.W. et al. (2001). "Automated name authority control." In Proceedings of the ACM/IEEE First Joint Conference on Digital Libraries, 21-22.*
Han, X. et al. "Named Entity Disambiguation by Leveraging Wikipedia Semantic Knowledge." Proceedings of the 18th ACM Conference on Information and Knowledge Management (CIKM '09), 2009, pp. 215-224. DOI:10.1145/1645953.1645983.*
Search Report issued in International Application No. PCT/US2014/021461 on Feb. 6, 2015, 11 pages.

(Continued)

*Primary Examiner* — Stanley K Hill
*Assistant Examiner* — Benjamin Buss
(74) *Attorney, Agent, or Firm* — Steven Spellman; Tom Wong; Micky Minhas

(57) ABSTRACT

Various techniques for chronology based content processing are disclosed herein. For example, in one embodiment, a method includes receiving a content containing a plurality of facts and determining a subject and a chronological value for each of the facts contained in the content. The subject includes at least one of a person, a place, an object, or an event, and wherein the chronological value includes at least a date. The method also includes assembling the facts in the content based on the determined subjects and corresponding chronological values for the individual facts.

20 Claims, 5 Drawing Sheets

(56) References Cited

OTHER PUBLICATIONS

Mitsuo Yamamoto et al: "Extraction and 1-10 Geographical Navigation of Important Historical Events in the Web", Mar. 3, 2011 (2(HI-e3-e3), Web and Wireless Geographical Information Systems, Springer Berlin Heidelberg, Berlin, Heidelberg, pp. 21-35, XP019160405, ISBN: 978-3-642-19172-5, sections 1-3.

Remy Kessler et al: "Finding Salient Dates for Building Thematic Timelines", Proceedings of the 50th Annual Meeting of the Association for Computational Linguistics, Jul. 8, 2012, pp. 730-739, XP055165673, Retrieved from the Internet: URL: http://www.aclweb. orgfanthology/Pl2-1077 [retrieved on Jan. 28, 2015] sections 1 and 4.

Abhijit Bhole et al: "Extracting Named Entities and Relating Them over Time Based on Wikipedia," Informatica, vol. 31, Jan. 1, 2007, pp. 463-468, XP55165976, section 2.

Daniel Hienert et al: "Extraction of Historical Events from Wikipedia," May 18, 2012, XP055165671, Retrieved from the Internet: URL:http:f/arxiv.org/abs/1205.4138 sections 2-4.

Zhou L et al: "A temporal constraint structure for extracting temporal information from clinical narrative," Journal of Biomedical Informatics, Academic Press, New York, NY, US, vol. 39, No. 4, Aug. 1, 2006, pp. 424-439, XP024969814, ISSN: 1532-0464, DOI:10.1016/J.JBI.2005.07.002 [retrieved on Aug. 1, 2006] sections 1, 3 and 4.

"International Preliminary Report on Patentability Issued in PCT Application No. PCT/US2014/021461", Mailed Date: Aug. 28, 2015, 9 Pages.

"Second Written Opinion Issued in PCT Application No. PCT/US2014/021461", Mailed Date: Jun. 5, 2015, 8 Pages.

Alonso, et al., "Clustering and Exploring Search Results using Timeline Constructions", In Proceedings of the 18th ACM Conference on Information and Knowledge Management, Nov. 2, 2009, 10 pages.

Alonso, et al., "Exploratory Search Using Timelines", In SIGCHI Workshop on Exploratory Search and HCI Workshop, Apr., 2007, 4 pages.

Alonso, et al.,"Effectiveness of Temporal Snippets", In WSSP Workshop at the World Wide Web Conference, vol. 9, Apr. 20, 2009, 4 pages.

Jin, et al., "CT-Rank: A Time-aware Ranking Algorithm for Web Search", In Journal of Convergence Information Technology, vol. 5, Issue 6, Aug. 2010, 13 pages.

Ringel, et al., "Milestones in Time: The Value of Landmarks in Retrieving Information from Personal Stores", In Proceedings of IFIP Interact: Human-Computer Interaction, Sep. 1, 2003, 8 pages.

\* cited by examiner

CHRONOLOGY BASED CONTENT PROCESSING

BACKGROUND

Web pages, data feeds, electronic articles, electronic books, or other forms of electronic content can include a mix of facts about different people, places, objects, events, or other subjects. For example, an encyclopedia article about Steve Jobs may include information about corporations (e.g., Apple Computer, NeXT computer, Pixar, Pepsi-Cola, and Disney), places (e.g., Reno, Nev.), other people (e.g., Bill Gates, Dmitry Medvedev, Paul McCartney, and Steve Wozniak), events (e.g., personal computer revolution), and objects (e.g., iPhone, iPod, iPad, etc.).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present technology is directed to analyzing content having facts to determine identities of people, places, objects, events, or other types of subjects with an associated date/time, season, period of time, and/or other chronological values. The facts in the content may then be associated with, organized, and/or stored in a network server, a client device, and/or other suitable storage locations, based on the identified subjects and corresponding chronology values. Upon receiving from a user a request for information about a subject, in certain embodiments, the server may query the stored facts to identify and retrieve facts corresponding to the requested subject and transmit the retrieved facts and also chronology values associated with the facts to the user. In other embodiments, the client device may query the stored facts with respect to the requested subject and present the retrieved facts with corresponding chronology values to the user.

DETAILED DESCRIPTION

Various embodiments of systems, devices, components, modules, routines, and processes for chronology based content processing are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-5.

As used herein, the term a "subject" generally refers to a person, place, object, event, or other types of topic for which a user may desire to obtain information. Also used herein, the term "content" generally refers to web pages, data feeds, electronic articles, electronic books, and/or other information containing facts. For example, web pages can include electronic encyclopedia pages (e.g., Wikipedia). Data feeds can include news feeds, information updates, emails, and/or other suitable types of mechanisms for users to receive updated data from data sources. Electronic articles or books can include publications in digital form produced on, published through, and/or readable on computers, tablets, smartphones, and/or other suitable computing devices.

As discussed above, a succinct list of facts about people, places, objects, events, or other types of subject matters may not be readily available to users. Several embodiments of the present technology are directed to automatically detecting facts associated with respect to people, places, objects, events, or other types of subjects and chronology values associated with the facts contained in a content. The facts may then be associated with, arranged, and stored based on the detected subjects and chronology values. As a result, users may readily obtain a time line of facts about a particular subject from the stored facts.

Figure 1:
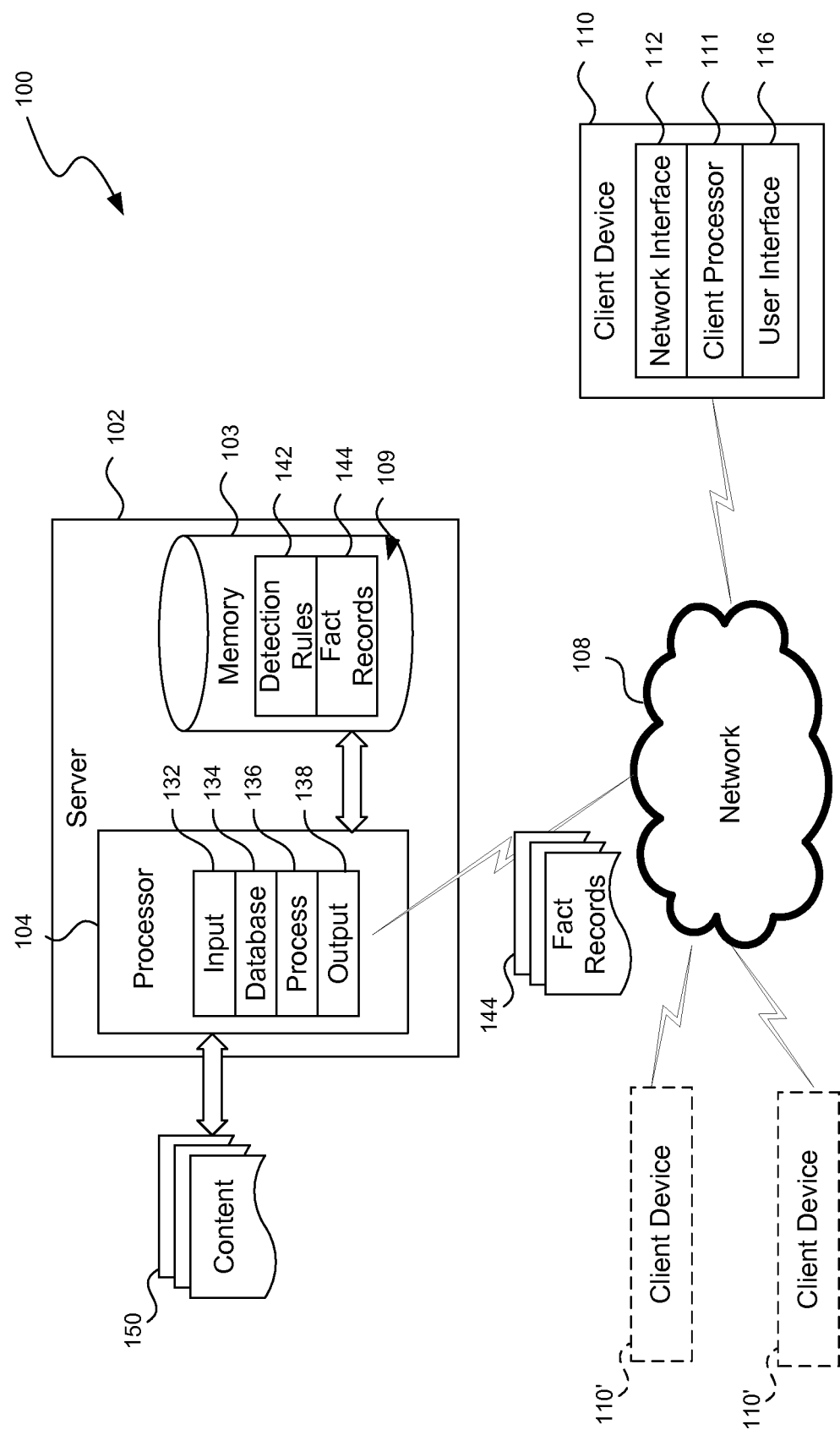
FIG. 1 is a schematic block diagram illustrating a computer framework for chronology based content processing in accordance with embodiments of the present technology.

FIG. 1 is a schematic block diagram illustrating hardware and/or software components of a computer framework 100 for chronology based content processing in accordance with embodiments of the present technology. In FIG. 1 and in other Figures hereinafter, individual software components, modules, and routines may be a computer program, procedure, or process written as source code in C, C++, Java, and/or other suitable programming languages. The computer program, procedure, or process may be compiled into object or machine code and presented for execution by one or more processors of a personal computer, a network server, a laptop computer, a smartphone, and/or other suitable computing devices. Various implementations of the source and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1, the computer framework 100 can include a server 102 in electronic communication with a client device 110 via a network 108. In other embodiments, the computer framework 100 can also include optional client devices 110' (shown in phantom lines for clarity) that may be generally similar to or different from the client device 110. In further embodiments, the computing framework 100 can include additional servers, client devices, networking devices, and/or other suitable components (not shown). The network 108 can be the Internet, a local area network, a metropolitan area network, a wide area network, and/or other suitable types of network. Even though aspects of the present technology are described below with respect to the computer framework 100 in FIG. 1, in other embodiments, various aspects of chronology based content processing may be performed by the client device 110 or other suitable devices (not shown) in a standalone manner, in a local area network, and/or in other suitable manners. As such, the server 102 and/or the network 108 may be omitted. In further embodiments, the client device 110 may be omitted, and instead, another server (not shown) may be in electronic communication with the server 102 to consume data related to chronology based content processing.

In certain embodiments, the client device 110 can include a desktop, a laptop, a tablet, a smartphone, and/or other suitable types of computing device. As shown in FIG. 1, the client device 110 can include a client processor 111, a network interface 112, and a user interface 116 interconnected to one another. The client processor 111 can include a microprocessor, a field-programmable gate array, and/or other suitable logic devices. The network interface 112 can include a network adapter, a wireless network interface controller, and/or other suitable hardware/software configured to enable communication of the client device 110 with the server 102 via the network 108. The user interface 116 can include a display, a touch screen, a keyboard, a track ball, and/or other suitable types of input/output component configured to accept input from and/or provide output to a user. Even though only the foregoing components of the client device 110 are shown in FIG. 1, in other embodiments, the client device 110 may also include other suitable hardware/software components.

The server 102 can be configured analyze content 150 to extract a list of fact records 144 about a subject from the content 150. Upon receiving a request from the client device 110 or the optional client devices 110', the server 102 can also be configured to transmit a list of facts about the requested subject to the client device 110 or the optional client devices 110'. Even though the server 102 is illustrated in FIG. 1 as a single computing device, in certain embodiments, the server 102 may include one or more separate computing devices individually configured to perform at least one of the foregoing functions. For example, the server 102 can include one or more back-end servers (not shown) configured to analyze the content 150 to extract the fact records 144. The server 102 can also include one or more web servers (not shown) configured to transmit a list of facts about a requested subject. In other embodiments, the server 102 may include other suitable types of components arranged in other suitable manners.

As shown in FIG. 1, the server 102 can include a processor 104 operatively coupled to a memory 103. The processor 104 can include a mainframe processor, a microprocessor, a field-programmable gate array, and/or other suitable logic devices. The memory 103 can include volatile and/or nonvolatile computer readable storage media (e.g., magnetic disk storage media, optical storage media, and flash memory drives). As used herein, the term "computer readable storage medium" excludes propagating signals. The memory 103 can be configured to store data received from, as well as instructions for, the processor 104. As shown in FIG. 1, the memory 103 can include a database 109 that contains detection rules 142 and fact records 144. In other embodiments, the database 109 may contain other suitable records. In other embodiments, the server 102 can also include one or more Hadoop Distributed File System ("HDFS") sub-servers and/or other suitable components (not shown).

The processor 104 can be configured to execute instructions of software components. For example, as shown in FIG. 1, software components of the processor 104 can include an input component 132, a database component 136, a process component 136, and an output component 138. The input component 132 may collect, receive, or accept the content 150 and communicates the information to other components for further processing. The database component 134 may organize records, including detection rules 142 and fact records 144, and facilitate storing and retrieving of these records to and from the database 109. Any type of database organization may be utilized, including a flat file system, hierarchical database, relational database, or distributed database. The process component 136 may analyze the content 150 based on the detection rules 142 to generate the fact records 144. The output component 138 may transmit a list of requested fact records 144 to the client device 110 via the network 108. Embodiments of the process component 136 are described in more detail below with reference to FIG. 2.

In operation, the server 102 collects, receives, or otherwise obtains the content 150 with the input component 132. Based on the detection rules 142, the process component 136 analyzes the content 150 to identify subjects and corresponding chronology values in the content 150. The process component 136 then associates and arranges facts in the content 150 with the identified subjects and corresponding chronology values. The database component 134 may then facilitate storing the arranged facts as fact records 144 in the database 109. In certain embodiments, upon receiving a request for information about a subject, the database component 134 facilitates query and retrieval of a list of fact records 144 for the subject. In other embodiments, the request can also include the subject and a date. The database component 134 then facilitates query and retrieval of a list of fact records 144 based on both the subject and the date in the request. In further embodiments, an additional hardware and/or software component (e.g., an HDFS sub-server, not shown) may be configured to perform the foregoing operations in addition to or in lieu of the database component 134 of the server 102. The output component 138 then transmits the retrieved list of fact records 144 to the client device 110 or other suitable client devices. As such, a user of the client device 110 may readily obtain a succinct list of facts about the subject arranged in a chronological order.

Figure 2:
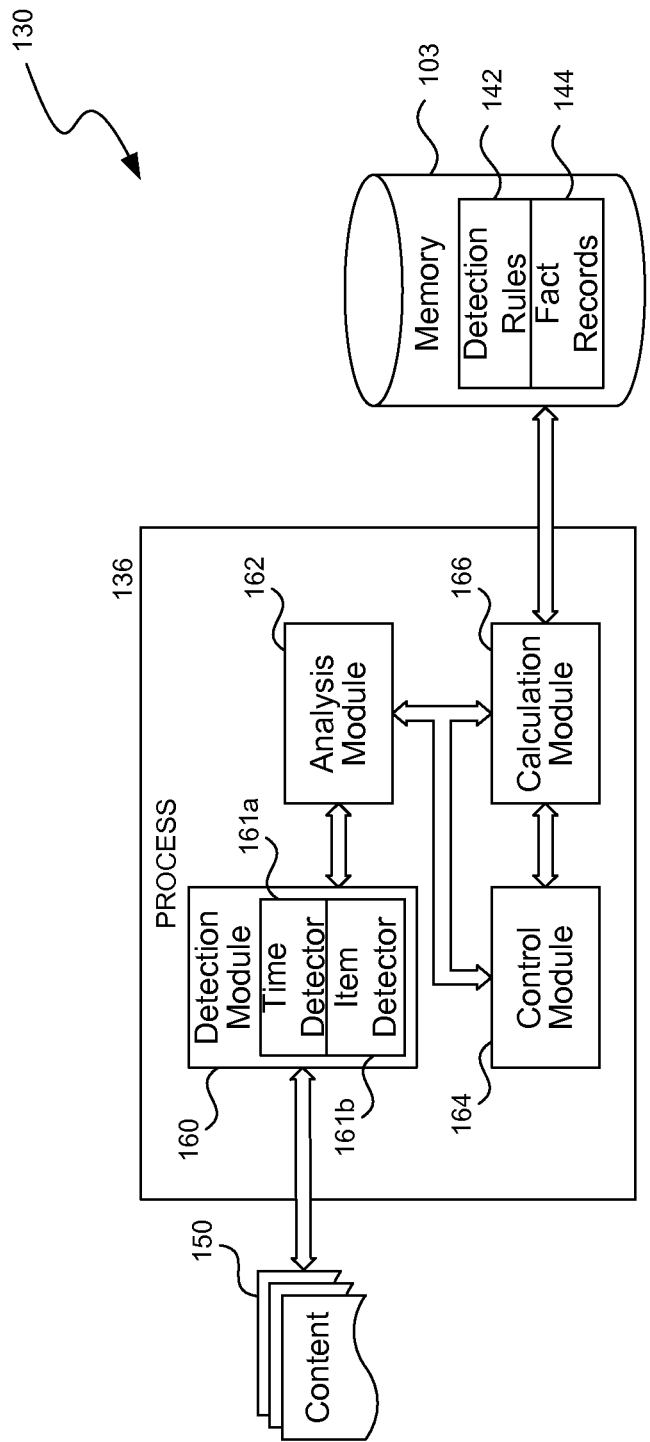
FIG. 2 is a block diagram showing software modules suitable for the process component of FIG. 1 in accordance with embodiments of the present technology.

FIG. 2 is a block diagram showing software modules 130 suitable for the process component 136 in FIG. 1 in accordance with embodiments of the present technology. As shown in FIG. 2, the process component 136 can include a detection module 160, an analysis module 162, a control module 164, and a calculation module 166 interconnected with one other. Each module may be a computer program, procedure, or routine written as source code in a conventional programming language, or one or more modules may be hardware modules.

The detection module 160 is configured to identify subjects and corresponding chronology values in the content 150. In the illustrated embodiment shown in FIG. 2, the detection module 160 includes a time detector 161a and an item detector 161b. In other embodiments, the detection module 160 may include a combined time/item detector and/or other suitable routines in addition to or in lieu of the time detector 161a and the item detector 161b.

In certain embodiments, the time detector 161a can be configured to detect a date, time, and/or other suitable reference point in a calendar system based on the detection rules 142. Examples of the detection rules 142 can include the following:

Numbers immediately before or after one of "January," "February," "March," "April," "May," "June," "July," "August," "September," "October," "November," or "December";
Numbers having a format of YYYY-MM-DD is a date;
Numbers having a format of YYYY/MM/DD is a date;
Numbers having a format of DD/MM/YYYY is a date;

Numbers having a format of YYYY.MM.DD is a date; and

Numbers having a format of MM-DD-YYYY is a date. where MM, DD, and YYYY are integer numbers. For example, if the content 150 includes an expression of "2013-02-13," then the time detector 161*a* can identify the expression as a date according to the second example detection rule 142 above.

The time detector 161*a* can also be configured to parse and/or otherwise transform the identified date. For instance, in the previous example, the time detector 161*a* can be configured to determine that the expression of "2013-02-13" includes a year of "2013," a month of February, and a day of the 13$^{th}$. Thus, the time detector 161*a* may transform the identified date into "Feb. 13, 2013," "Feb. 13, 2013," 2013.02.13," and/or other suitable format.

In further embodiments, the time detector 161*a* can also be configured to recognize relative chronology terms in the content 150. As used herein, a "relative chronology term" general refers to a chronology value expressed in relation to a referenced point in a calendar system. Examples of relative chronology terms can include a number of seconds, minutes, hours, weeks, months, year, decade, or century, before or after a reference time point. In other examples, the relative chronology terms can also include ages, time lapses, and/or other suitable statements from which a date/time may be inferred. In yet other embodiments, the time detector 161*a* can be configured to detect other suitable chronological information via natural language processing, compound term processing, deep linguistic processing, semantic indexing, and/or other suitable techniques. Example operations of the time detector 161*a* are described in more detail later with reference to FIG. 3.

The item detector 161*b* can be configured to detect subjects in the content 150. For example, the item detector 161*b* may be configured to detect names of people (e.g., Steve Jobs), places (e.g., Reno, Nev.), objects (e.g., iPad), or events (e.g., personal computer revolution). In another example, the item detector 161*b* may also be configured to detect a title (e.g., Dr.), nickname, abbreviation (e.g., JFK), modification (e.g., Sr., Jr., etc.), and/or other suitable identifiers of subjects. In certain embodiments, the item detector 161*b* may be configured to detect the subjects based on the detection rules 142. For example, names, nicknames, abbreviations, modification, and/or other identifiers may be stored as detection rules 142 in the database 109. In other embodiments, the item detector 161*b* may be configured to detect the subjects via natural language processing and/or other suitable techniques. Example operations of the item detector 161*a* are described in more detail later with reference to FIG. 3.

The analysis module 162 may be configured to determine identities of the detected subjects based on chronological and/or other suitable context in the content 150. For example, the name "Steve Jobs" may be associated with multiple people. However, if the content 150 includes references to Apple Inc., the personal computer revolution, iPad, iPod, or computers in general, then the name "Steve Jobs" is likely referring to the co-founder and ex-CEO of Apple Inc. On the other hand, if the content 150 includes references to gold mining in the 1800's, then the name "Steve Jobs" is not likely referring to the co-founder and ex-CEO of Apple Inc. In another example, the name "Bill Gates" may be associated with the ex-CEO of Microsoft or the frontiersman and fortune hunter of the Klondike Gold Rush. If the content 150 includes references to Microsoft, computer software, or computer in general, the name "Bill Gates" is likely referring to the ex-CEO of Microsoft. If the content 150 includes references to gold, mining, gold mining, or Alaska, the name "Bill Gates" is probably referring to the frontiersman.

The calculation module 166 can include counters, timers, summers, subtractors, and/or other suitable accumulation routines configured to perform various types of calculations to facilitate operation of other modules. In one embodiment, the calculation module 166 may include a summer or subtractor that calculates a date value for a relative chronology term in the content 150. For example, if the content 150 includes an expression of "two days ago" from a reference date, then the expression "two days ago" may be converted into a date by subtracting two days from the reference date. In other embodiments, the calculation module 166 may include routines for performing time averaging, window averaging, filtering, and/or other suitable operations.

The control module 164 is configured to associate facts of the content 150 individually with the detected subjects with corresponding chronology value. In certain embodiments, the control module 164 may be configured to identify a chronology range for the content 150. For example, the control module 164 may determine a chronology range of Feb. 24, 1955 to Oct. 5, 2011, in the sentence "Steven Paul Jobs (Feb. 24, 1955-Oct. 5, 2011) was an American entrepreneur and inventor, best known as the co-founder, chairman, and CEO of Apple Inc." In other embodiments, the control module 164 may not be configured to identify a chronology range because a range is not available and/or other suitable reasons.

The control module 164 may also be configured to divide the content 150 into chapters, paragraphs, sentences, fragments, and/or other suitable sections, and associate the individual sections with one or more detected subjects and corresponding chronology value based on at least one of grammar, syntax, and/or other suitable criteria. For instance, if a first section includes a detected subject (e.g., "Steve Jobs") and a chronology value (e.g., "1955"), the control module 164 may associate the first section with the detected subject and chronology value. In one example, if a second section immediately following the first section does not contain any subject or chronology value, then the control module 164 may associate the second section to the subject (e.g., "Steve Jobs") and chronology value (e.g., "1955") of the first section. In another example, if the second section does not contain any subject but contains different chronology value (e.g., "1960"), the control module 164 may associate the second section with the subject (e.g., "Steve Jobs") of the first section but with the new chronology value (i.e., "1960"). In a further example, if the second section contains a new subject (e.g., "Bill Gates") but does not contain any new chronology value, the control module 164 may associate the second section with the new subject (i.e., "Bill Gates") with the chronology value (i.e., "1955") of the first section. In yet a further example, if the second section contains a first detected subject (e.g., "Steve Jobs") and a second subject (e.g., "Bill Gates"), the control module 164 may infer that the second section is related to both the first and second subject with the chronology value of the first section.

The control module 164 may also be configured to assemble facts associated a particular subject (e.g., "Steve Jobs") with corresponding chronology values. As used herein, "assembling facts" generally refers to creating and/or modifying a collection of facts regarding a particular subject. Assembling facts may include arranging facts, filtering facts, accepting user editing of certain facts, and/or other suitable operations. In one embodiment, the control module 164 is configured to assemble facts only associated with the particular subject. In other embodiments, the control module 164 is configured to assemble facts associated at least with the particular subject. In further embodiments, the control module 164 may be configured to assemble facts in other suitable manners. The facts from the searches may be arranged as records in chronological and/or other suitable orders. The control module 164 is also configured to establish dependencies, associations, or relationships of various subjects in the assembled facts.

In operation, the detection module 160 receives the content 150 and detects subjects with corresponding chronology value with the time detector 161*a* and the item detector 161*b*. During detection of the chronology value, the calculation module 166 may facilitate converting relative chronology terms into a date and/or other suitable reference point in a calendar system. The analysis module 162 then analyzes the content 150 to determine identities of the detected subjects based on chronological and/or other suitable context in the content 150. Based on the determined identities and the detected and/or converted chronology value, the control module 164 associates facts contained in portions of the content 150 with at least one identified subject and at least one chronology value. The control module 164 then assembles the facts based on the determined identities and corresponding chronology values.

Figure 3:
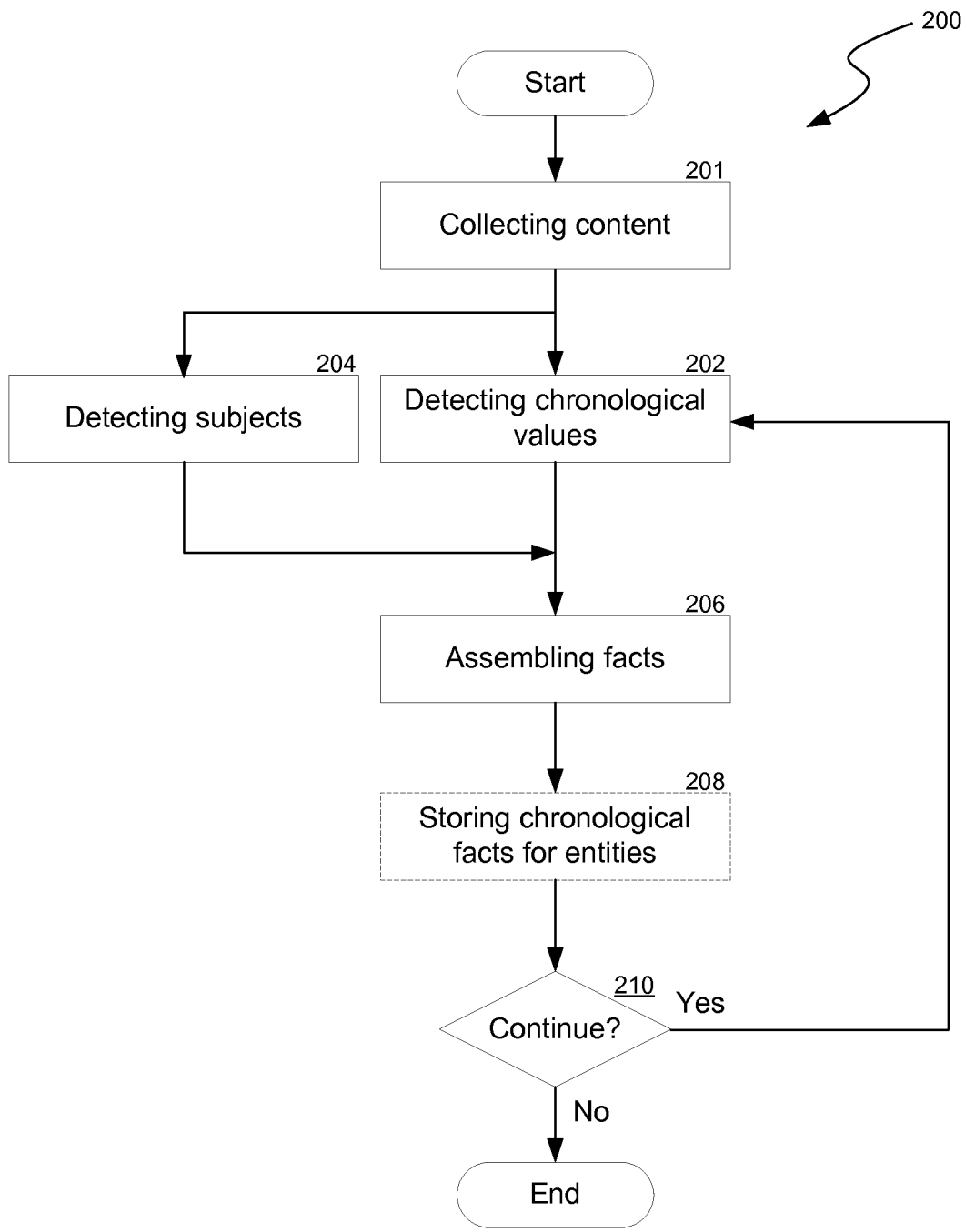
FIG. 3 is a flow diagram illustrating a process for chronology based content processing in accordance with embodiments of the present technology.

FIG. 3 is a flow diagram illustrating a process 200 for chronology based content processing in accordance with embodiments of the present technology. Even though the process 200 is described below with reference to operations associated with the computing framework 100 of FIG. 1 and the software components/modules of FIG. 2, the process 200 may also be applied in other systems with additional or different hardware and/or software components.

As shown in FIG. 3, the process 200 can include collecting the content 150 (FIG. 1) by, for example, the server 102 (FIG. 1) and/or other computing devices at stage 201. In one embodiment, the content 150 may be collected from a computer network (e.g., the Internet) via web crawling, web scraping, and/or other suitable information extraction techniques. In another embodiment, the content 150 may be scanned or otherwise collected from a web page (e.g., a Wikipedia page), an electronic book, and/or other sources. In yet another embodiment, the content 150 may be provided by one or more users. In further embodiments, the content 150 may be collected in other suitable manners from other suitable sources.

The process 200 then includes detecting one or more chronological values (e.g., with the time detector 161*a* in FIG. 2) at stage 202 and detecting one or more subjects (e.g., with the item detector 161*b* in FIG. 2) at stage 204. Even though detecting subjects at stage 204 and detecting chronological information at stage 202 are shown in FIG. 3 as being parallel to each other, in other embodiments, operations of these stages 202 and 204 may be performed in sequence, interleaved, or in other suitable manners.

In certain embodiments, detecting chronological values can include identifying chronological tokens and relative chronology terms. The term "chronological token" generally refers to numbers, words, phrases, or other representations of a date and/or time. Chronological tokens can individually include at least one of a year, month, day, time, and/or other suitable reference points in a calendar system. For example, in the sentence "Steven Paul Jobs (Feb. 24, 1955-Oct. 5, 2011) was an American entrepreneur and inventor, best known as the co-founder, chairman, and CEO of Apple Inc." both Feb. 24, 1955 and Oct. 5, 2011 can be identified as chronological tokens. The term "relative chronology term" generally refers to numbers, words, phrases, or other representations of a time period relative to a reference date and/or time. For example, in the sentence "[the] Jobs family moved from San Francisco to Mountain View, Calif. when Steve was five years old," the phrase "when Steve was five years old" can be a relative chronology term. The detected relative chronology terms may then be converted into chronological tokens based on context in the content 150. In the previous example, the process 200 can determine that the Jobs family moved to Mountain View, Calif. in 1960 because Steve was born in 1955.

In certain embodiments, detecting subjects can include detecting references to subjects and identifying the subjects associated with the references. The references to subjects can include names, nicknames, abbreviations, modifications, and/or other suitable designations. Such references may be detected by parsing, natural language processing, and/or other suitable techniques. The references can then be analyzed to determine the identities of the subjects the references are directed to. For example, the name "George Washington" can be directed to the first President of the United States, or an American jazz trombonist who had played in Louis Armstrong's orchestra.

In one embodiment, the identities of the subjects may be determined based on at least one keyword or phrase in the content 150. In the previous example, if the content 150 includes keywords such as "American Revolution," "military career," the name "George Washington" is probably directed to the first President of the United States. On the other hand, if the content 150 includes keywords such as "trombone," "orchestra," "ensembles," the name "George Washington" is probably directed to the American jazz trombonist. In certain embodiments, all of the keywords may have the same weight for determining the identities of the subjects. In other embodiments, at least one of the keywords may have a different weight than other keywords.

In another embodiment, the identities of the subjects may be determined by comparing one or more corresponding chronology tokens to reference values or value ranges. For instance, in the previous example, if the content 150 includes chronology tokens such as 1907, 1932, and 1933, the name "George Washington" is probably not directed to the first President of the United States because the chronology tokens falls outside of his lifetime from 1732 to 1799. On the other hand, if the content 150 includes chronology tokens such as 1732, 1776, and 1795, the name "George Washington" is probably not directed to the American jazz trombonist.

In yet another embodiment, the identities of the subjects may be determined based on one or more references to other people in the content 150. For instance, in the previous example, if the content 150 includes references to "Thomas Jefferson," "John Adams," or "Friedrich von Steuben," the name "George Washington" is probably directed to the first President of the United States. On the other hand, if the content 150 includes references to "Louis Armstrong," "Red Allen," or "Fletcher Henderson," the name "George Washington" is probably directed to the American jazz trombonist. In further embodiments, the identities of the subjects may be determined based on a combination of at least some of the foregoing techniques with equal or different weights for different techniques.

The process 200 then includes assembling facts for individual subjects at stage 206. In certain embodiments, sentences, paragraphs, and/or other components of the content 150 may be associated with and sorted based on the detected subjects and chronological tokens, as discussed in more detail above with reference to FIG. 2. As a result, a list of chronological facts may be obtained for one of the detected subjects. For instance, in the previous example, a list of chorological facts for "George Washington," the American jazz trombonist can include a time line of his birth, education, music career, and death. An example list of chronological facts is shown in FIG. 5.

The process 200 can then optionally include storing the assembled facts for the individual subjects in a database (e.g., the database 109 of FIG. 1) at stage 208. The process 200 then includes a decision stage 210 to determine if the process continues. In one embodiment, the process continues if additional contents are to be processed. In other embodiments, the process may continue based on other suitable criteria. If the process continues, the process 200 reverts to detecting chronological values at stage 202 and detecting subjects at stage 204; otherwise, the process ends.

Figure 4:
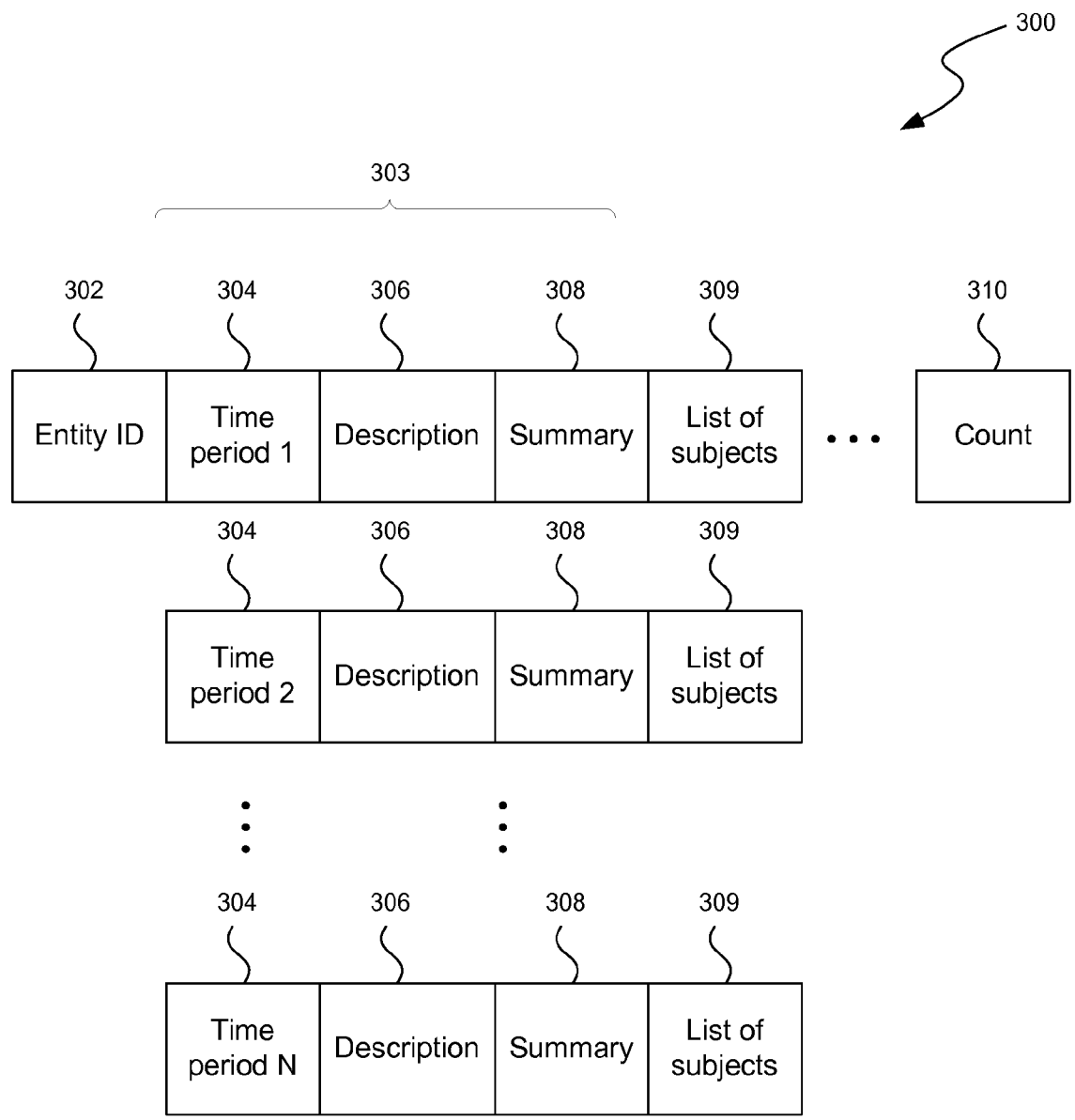
FIG. 4 is an example database schema illustrating a chronological fact record in accordance with embodiments of the present technology.

FIG. 4 is an example database schema 300 illustrating a chronological fact record in accordance with embodiments of the present technology. As shown in FIG. 4, the database schema 300 can include an entity ID 302, a plurality of chronology facts 303, a count 310, and/or other suitable data fields. As shown in FIG. 4, the chronology facts 303 can be organized as a plurality of sets of chronology entries each including a time period 304 (e.g., a start and an end date/time), a description 306, a summary 308, and a list of subjects 309 in the chronology fact 303. In other embodiments, the chronology facts 303 may be organized in other suitable manners and/or contain different and/or additional data fields.

Figure 5:
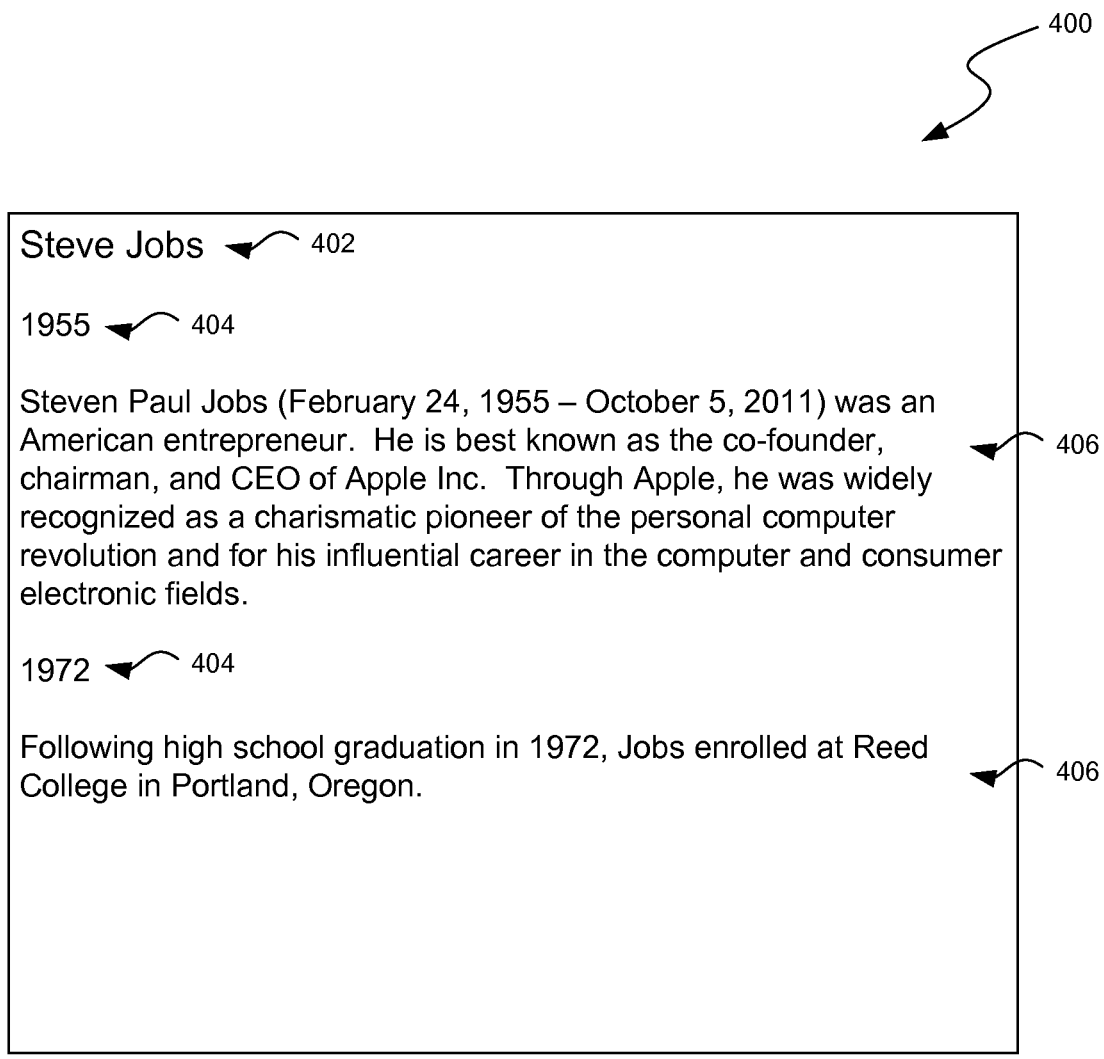
FIG. 5 is an example rendering of a set of chronological facts in accordance with embodiments of the present technology.

FIG. 5 is an example rendering of a set of chronological facts 400 in accordance with embodiments of the present technology. As shown in FIG. 5, the set of chronological facts 400 can include an entity identifier (i.e., "Steve Jobs"), a plurality of chronology identifiers 404 (i.e., 1955 and 1972), and summaries of facts 406 associated with the respective chronology identifiers 404. In other embodiments, the set of chronological facts 400 can have other suitable rendering arrangements.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A method performed by at least one processor, the method comprising:
  accessing a document containing a plurality of facts;
  detecting a chronological value for each of the plurality of facts contained in the document;
  detecting a subject reference for each of the plurality of facts contained in the document, wherein the subject reference includes at least one of a person, a place, an object, or an event;
  determining an identity of the subject reference for each of the plurality of facts from a context in the document and a detection rule; and
  assembling the plurality of facts into a record based on the determined identity and the chronological value for each of the plurality of facts.

2. The method of claim 1 wherein, the context includes at least one of a keyword, a person, a place, an object, an event, or the chronological value.

3. The method of claim 1 wherein the chronological value includes a date having at least one of a year, month, or day.

4. The method of claim 1 wherein the chronological value includes a relative chronology term and the method further comprises converting the relative chronology term into a date based on the relative chronology term and a reference point.

5. The method of claim 1 further comprising:
  organizing the plurality of facts in the record in chronological order.

6. The method of claim 1 further comprising:
  dividing the document into a plurality of portions including at least a first portion and a second portion;
  determining that the second portion of the document does not include a chronology value; and
  associating a detected chronological value for the first portion of the document with the second portion of the document.

7. The method of claim 1 further comprising:
  dividing the document into a plurality of portions including at least a first portion and a second portion;
  determining that the second portion of the document does not include a subject reference; and
  associating an identity of a subject reference detected in the first portion of the document with the second portion of the document.

8. A method performed by a processor, the method comprising:
  receiving a request for a subject from a client device, the subject including at least one of a person, a place, an object, or an event;
  searching a document containing a plurality of facts relating to a plurality of subjects for a requested subject;
  detecting a chronological value for each of the plurality of facts contained in the document;
  detecting a subject reference for each of the plurality of facts contained in the document;
  determining which of the plurality of facts relates to the requested subject based on the subject reference and a context, wherein the context is from the document and includes at least one of a keyword, a person, a place, an object, an event, or the chronological value;
  retrieving each of the plurality of facts that relates to the requested subject;
  organizing the retrieved facts that relate to the requested subject in chronological order based on the detected chronological value; and
  transmitting the organized facts related to the requested subject to the client device.

9. The method of claim 8, wherein the document comprises a plurality of documents.

10. The method of claim 8, wherein the chronological value includes a relative chronology term and method further comprises converting the relative chronology term into a date based on the relative chronology term and a reference point.

11. A computer system comprising:
  a processor; and
  a memory communicatively coupled to the processor, the memory storing computer-readable instructions that when executed by the processor cause the computer system to:

access a document containing a plurality of sections and for each of the plurality of sections:
  detect a subject reference in the section, wherein the subject reference includes at least one of a person, a place, an object, or an event;
  detect a chronology value in the section; and
  determine an identity of the subject reference based on a context contained within the document;
assemble a record based on the determined identity of the subject reference and the chronological values for each of the sections.

12. The computer system of claim 11 wherein the context includes at least one of a keyword, a person, a place, an object, an event, or the chronological value.

13. The computer system of claim 11 wherein the chronological value includes a date having at least one of a year, month, or day.

14. The computer system of claim 11, wherein the chronological value includes a relative chronology term and computer system further comprises computer-readable instructions that when executed by the processor cause the computer system to:
  convert the relative chronology term into a date based on the relative chronology term and a reference point.

15. The computer system of claim 11, further comprising computer-readable instructions that when executed by the processor cause the computer system to:
  organize the record in chronological order.

16. The computer system of claim 11, wherein the plurality of sections includes at least a first section and a second section and the computer system further comprises computer-readable instructions that when executed by the processor cause the computer system to:
  determine that the second portion of the document does not include a chronology value; and
  associate a detected chronological value for the first section of the document with the second portion of the document.

17. The computer system of claim 11, wherein the plurality of sections includes at least a first section and a second section and the computer system further comprises computer-readable instructions that when executed by the processor cause the computer system to:
  determine that the second section of the document does not include a subject reference;
  associate an identity of a subject reference detected in the first section of the document with the second section of the document.

18. The computer system of claim 11, further comprising computer-readable instructions that when executed by the processor cause the computer system to:
  determine the identity of the subject reference based on a detection rules.

19. The computer system of claim 18, wherein the detection rule comprises one or more reference values for one or more subjects.

20. The computer system of claim 18, wherein the document comprises a plurality of predefined documents.

* * * * *